(12) United States Patent
Gao

(10) Patent No.: US 7,740,249 B1
(45) Date of Patent: Jun. 22, 2010

(54) HOLDER FOR REPLACEABLE TOOLS

(75) Inventor: Hua Gao, Fox Point, WI (US)

(73) Assignee: Bradshaw Medical, Inc., Kenosha, WI (US)

( * ) Notice: Subject to any disclaimer, the term of this patent is extended or adjusted under 35 U.S.C. 154(b) by 930 days.

(21) Appl. No.: 11/414,680

(22) Filed: May 1, 2006

(51) Int. Cl.
*B23B 31/22* (2006.01)
*B23B 31/107* (2006.01)

(52) U.S. Cl. .......................... 279/75; 279/22; 279/905; 81/438

(58) Field of Classification Search .................. 297/75, 297/82, 22, 74, 30, 905, 155, 19.4, 66, 137, 297/140, 904; 408/240; 81/438; *B23B 31/22, B23B 31/107*
See application file for complete search history.

(56) References Cited

U.S. PATENT DOCUMENTS

| | | | |
|---|---|---|---|
| 3,767,218 A | 10/1973 | Linthicum | |
| 3,947,047 A | 3/1976 | Hultman | |
| 4,692,073 A * | 9/1987 | Martindell | .............. 408/239 A |
| 4,900,202 A * | 2/1990 | Wienhold | ................... 408/240 |
| 5,741,263 A * | 4/1998 | Umber et al. | ................. 606/80 |
| 5,810,366 A * | 9/1998 | Montjoy et al. | ............... 279/43 |
| 5,947,484 A | 9/1999 | Huggins | |
| 5,996,452 A | 12/1999 | Chiang | |
| 6,092,814 A * | 7/2000 | Kageler | ...................... 279/19.4 |
| 6,224,303 B1 | 5/2001 | Wheeler | |
| 6,270,085 B1 * | 8/2001 | Chen et al. | ..................... 279/22 |
| 6,311,989 B1 | 11/2001 | Rosanwo | |
| 6,325,393 B1 * | 12/2001 | Chen et al. | ..................... 279/22 |
| 6,457,916 B2 | 10/2002 | Wienhold | |
| 6,561,523 B1 * | 5/2003 | Wienhold | ..................... 279/30 |
| 6,722,667 B2 | 4/2004 | Cantion | |
| 6,953,196 B1 | 10/2005 | Huang | |
| 6,966,562 B1 * | 11/2005 | Wienhold | ..................... 279/75 |
| 7,175,185 B2 * | 2/2007 | Chen | ......................... 279/75 |
| 7,448,302 B2 * | 11/2008 | Huang | ......................... 81/438 |
| 7,469,909 B2 * | 12/2008 | Strauch et al. | ................ 279/75 |
| 7,565,854 B2 * | 7/2009 | Chiang et al. | ................. 81/467 |
| 7,581,470 B1 * | 9/2009 | Huang | ......................... 81/438 |
| 7,669,860 B2 * | 3/2010 | Chiang | ....................... 279/143 |
| 2004/0164503 A1 | 8/2004 | Fan-Chiang | |
| 2004/0262856 A1 | 12/2004 | Cantion | |
| 2005/0036844 A1 * | 2/2005 | Hirt et al. | ................... 408/240 |
| 2005/0176283 A1 * | 8/2005 | Cantlon | ..................... 439/282 |

* cited by examiner

*Primary Examiner*—Eric A Gates
(74) *Attorney, Agent, or Firm*—Arthur J. Hansmann

(57) ABSTRACT

A holder for replaceable tools, including a body with an axial opening extending along an axis and for releasably receiving the tools and having two radial openings with balls therein extending into the axial opening. Two ramps are movable on the body and they engage the balls for forcing the balls onto the tool being held in the body and thereby radially and axially stabilize the tool in the body. Two separate springs engage the ramps for movement of the ramps separate from each other.

13 Claims, 3 Drawing Sheets

HOLDER FOR REPLACEABLE TOOLS

This invention relates to a holder for receiving replaceable and selected tools. The holder may be an adapter which is releasably connected and driven by a conventional driver, such as a hand rotated handle.

BACKGROUND OF THE INVENTION

The prior art is already aware of tool holders, including adapters, which are arranged for radially stabilizing replaceable and rotatable tools. Further, there are holders which utilize two axially spaced apart and spring urged balls for the stabilizing effect. In those occurrences, the springs and other members urging the balls into holding positions are arranged to have the spaced apart balls or the like under the influence of the same urging such that the holding balls act only in unison and not independent of each other. Thereby, the holding effort on the tool is limited to that one holding action with both balls moving only in unison and not adapting to independent ball movement and holding of the tool, and thus the holding action is limited in its precision.

The present invention improves upon the prior art in that it is precise in holding the various tools which are inserted into the holder. Those tools themselves may be imprecise in their configuration and therefore difficult to hold in radial and axial, accuracy, and this invention avoids those problems. Both radial and axial play are avoided.

Further, this invention can be reduced to an actual construction which produces a precise, efficient, and relatively inexpensive construction. There is optimum precision in the holding feature to thereby avoid radial play or movement of the tool relative to the holder itself. In this construction, there is achieved two separate and independent radial holdings, and only one motion is required to release the two holdings. So it is possible that the holder of this invention has the exterior shaping of that of the prior art and it is also operated the same as that of the prior art, so no new and different familiarizing by the user is required.

DETAILED DESCRIPTION OF A PREFERRED EMBODIMENT

Figure 4:
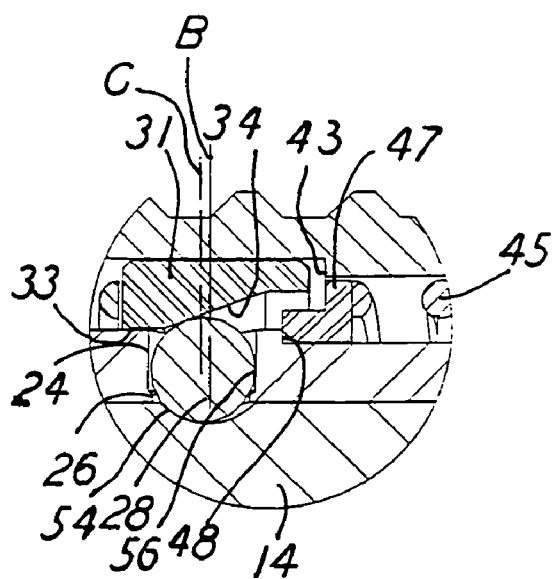
FIGS. 4 and 5 are respectively enlarged views of the designated circled portions "C" and "D" of FIG. 3.
Figure 6:
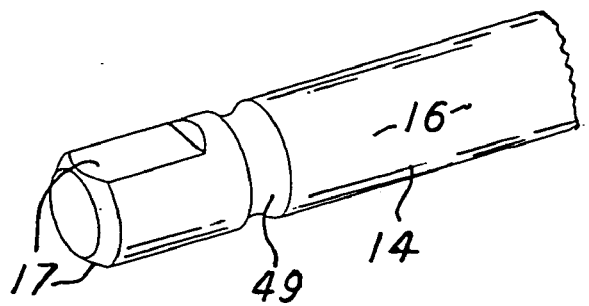
FIG. 6 is an enlarged perspective view of a tool which can be replaceably inserted into the holder of FIG. 1.
Figure 7:
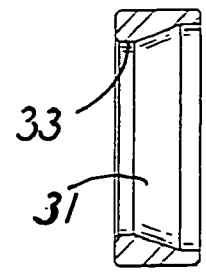
FIG. 7 is an enlarged section view of a part and taken on a plane designated by the line 7-7 of FIG. 2.
Figure 8:
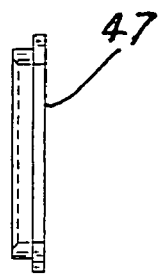
FIGS. 8 and 9 are respectively enlarged side elevation and perspective views of two parts shown in FIG. 2.
Figure 9:
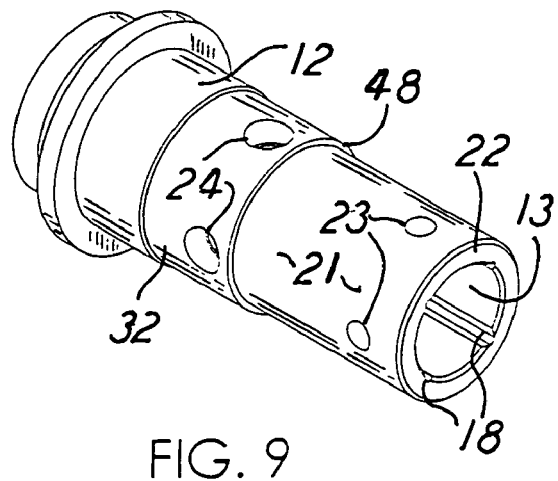
Figure 10:
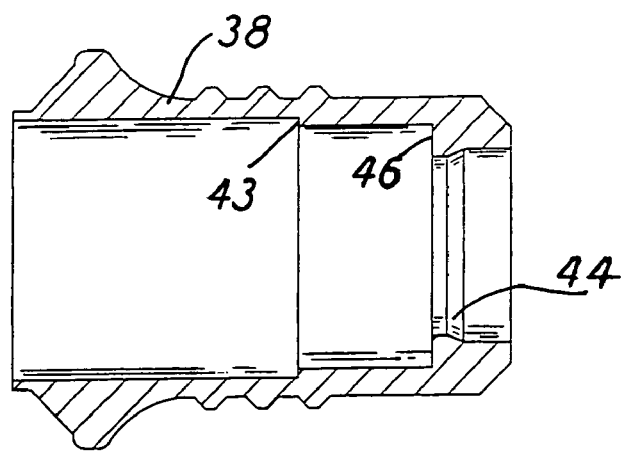
FIG. 10 is and enlarged section view taken on a plane designated by the line 10-10 of FIG. 2.

The drawings show the holder of this invention in the form of an adapter 10 which can be attached to an unshown but conventional rotation driver, including a hand rotatable handle. There is a threaded stem 11 for attaching to the unshown driver. The holder projects along a central axis A. The stem 11 is a fixed portion of a cylindrical holder body 12 which has an elongated axial opening 13. It is that opening 13 that replaceably receives work tools, such as the tool 14 as indicated in FIGS. 4 and 6. The tools 14 can have cylindrical shanks 16 which are snugly received in the elongated opening 13. Also, the tool 14 can have flats 17 which mate with a like interior notches or corners 18 on the body 12 for conventional rotational drive of the tool by the holder 10. The right working end end of the tool 14 is not shown, but it is conventional for these replaceable tools.

Figure 1:
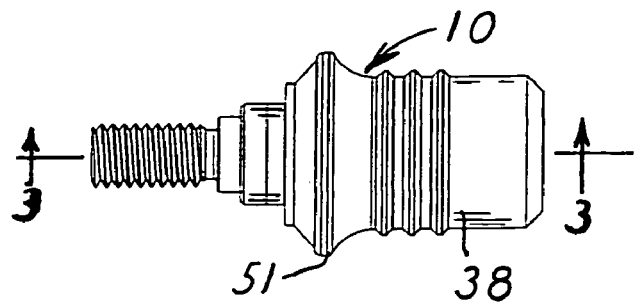
FIG. 1 is a side elevation view of an adapter type of holder containing this invention.
Figure 2:
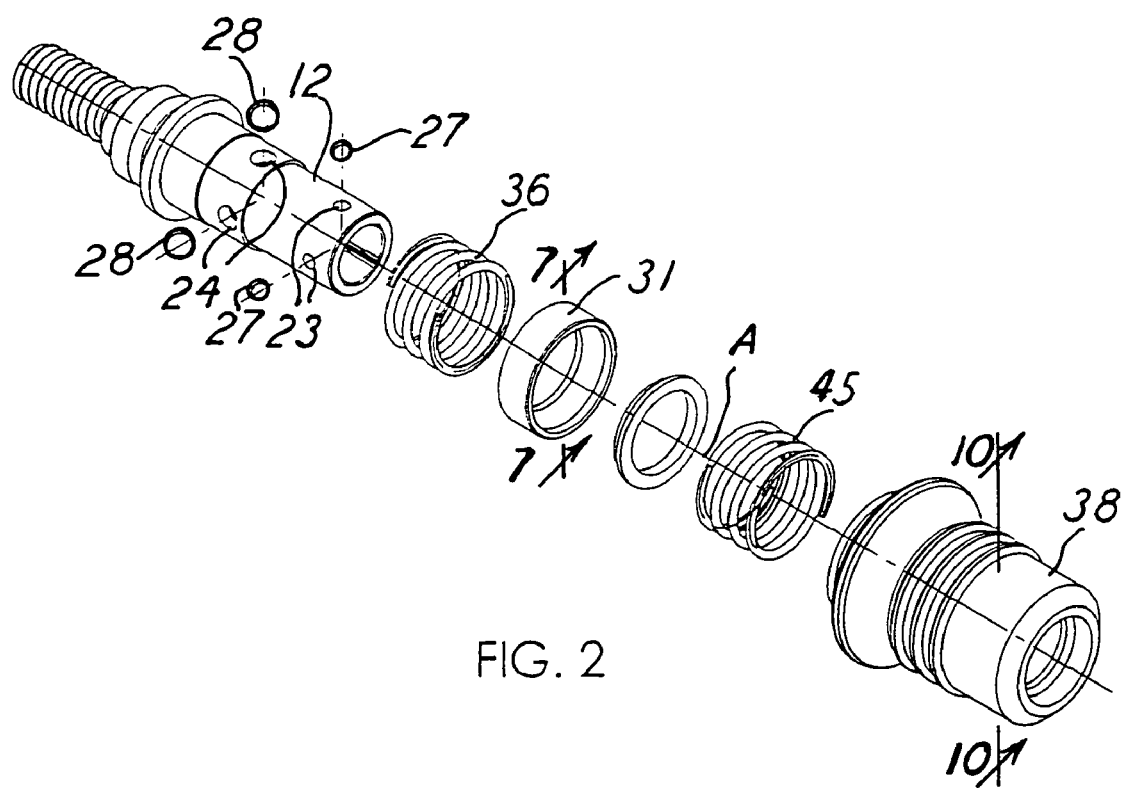
FIG. 2 is an exploded perspective view of the adapter seen in FIG. 1.
Figure 5:
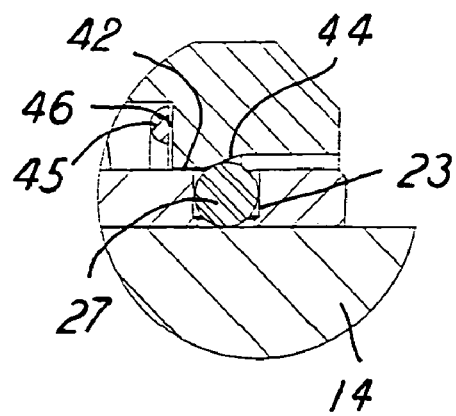

The body 12 has an interior cylindrical surface 19 and an exterior cylindrical surface 21 which together present a cylinder 22 therebetween which is coaxial with the axis A. The holder body 12 has several radially holes 23 and 24 axially spaced apart relative to axis A and spaced apart around the cylinder 22, as shown in FIG. 2. Shown are two holes 23 and two larger holes 24, and all those holes have a narrow ledge at 26. Balls 27 and 28 are disposed in the respective holes 23 and 24, and the balls are sized to snugly mate in the respective holes and the ledges 26 permit the respective balls to extend slightly into the opening 13 but the ledges prevent the balls from fully passing into the opening 13 even without the inclusion of the tool 14 being disposed in the opening 13, such as seen in FIGS. 4 and 5.

A ring 31 is telescoped on the body 12 and is axially slideable thereon. The ring 31 is in snug contact with the body at the circumference 32 of the body and at the interior circumference 33 of the ring 31. A circular caroming ramp 34 is on the interior of the ring 31 and it can slide onto and over the balls 28, and, upon rightward axial movement of the ring 31, as viewed in FIG. 4, the balls 28 are forced slightly into the opening 13.

Figure 3:
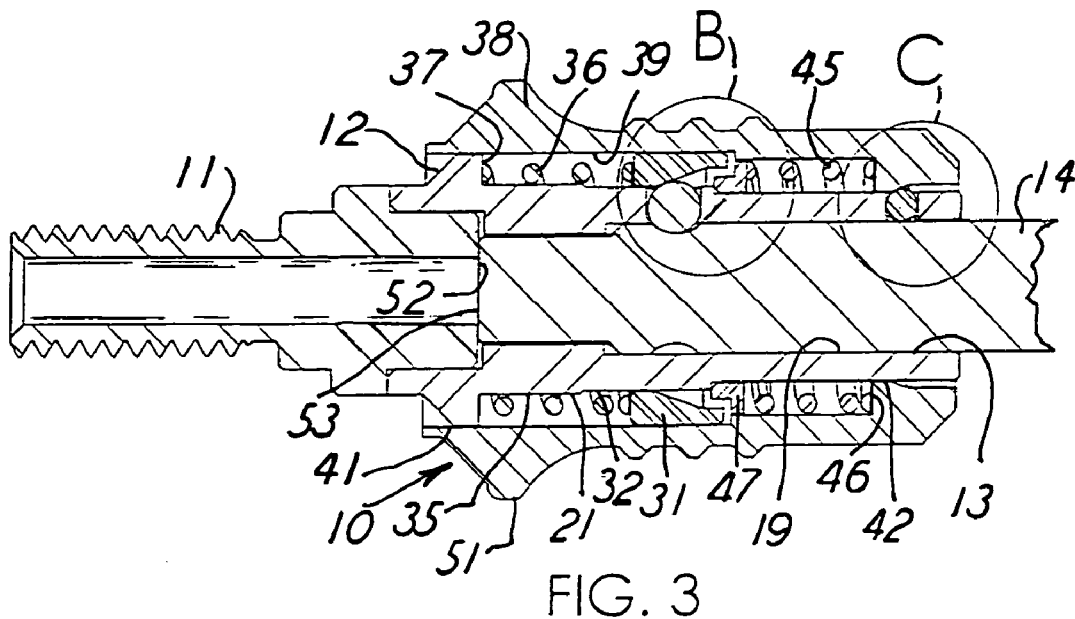
FIG. 3 is an enlarged section view taken on a plane designated by the line 3-3 of FIG. 1.

A compression spring 36 is piloted on the body circumference 35 and axially abuts the ring 31 and yieldingly urges the ring 31 to the right for the forcing the balls 28 into the respective holes 24. Thus, the body 12 has a circular shoulder 37 for abutment by the spring 36 in exertion against the ring 31. Of course the balls 28 project outwardly of the holes 24 and thus are in slideable contact with the ramp 34 and the balls 28 stop the ring 31 from moving rightwardly beyond the balls 28. There is a large ring or sleeve 38 encompassing the parts heretofore described, as seen in FIG. 3. So the ring 31 is slideably guided by the cylindrical interior wall 39 of the sleeve 38 and the wall 32 of the body 12, and the sleeve 38 itself is slideably guided on the circular surfaces at 41 and 42 of the body 12. So the ring 31 and the body 12 have snugly mating circular surfaces at 41 and 42 for axial and circular sliding therebetween, and for the guidance of the sleeve 38 on the body 12.

It will be noticed that there is a sleeve shoulder 43 in line with the end of the ring 31, but spaced therefrom, so the ring 31 is free to move rightwardly to only the limit presented by the balls 28, as shown in FIGS. 3 and 4. However, upon sliding the sleeve 38 leftward, the shoulder 43 will abut the ring 31 and likewise slide it leftward.

The sleeve itself has a circular camming ramp 44 which can extend over the balls 27 such that, upon rightward movement of the sleeve 38 to the position shown in FIGS. 3 and 5, the balls 27 are forced slightly into the opening 13 and into holding contact with the work tool 14. The limit for rightward movement of the sleeve are the balls 27 themselves. A second spring 45 is disposed between a sleeve shoulder 46 and a ring 47 on the body 12. In turn, the ring 47 is axially restricted by a shoulder 48 on the body 12.

So the foregoing will also be understood with regard to the presence of the work tool 14 in the opening 13, and the balls 27 and 28 are pressed against the exterior circumference of that work tool for the desired radial stabilizing of the work tool. Further, the tool 14 can have a circular groove 49 which receives a portion of the balls 28 and thereby releasably axially locks the tool 14 in the holder 10, in addition to the balls 28 radially pressing on the tool for avoidance of radial movement of the tools which are in the holder. Likewise, the balls 27 are pressed onto the tool, but independently of the positioning and forcing regarding the balls 28, and the balls 27 thereby also restrict the tool against radial movement. In that regard, this is a no-play holder for eliminating radially movement of the replaceable tools in the holder 10. The two camming ramps or surfaces 34 and 44 act separately, discretely, and independently relative to each other, both being under the axial influence of their own and separate compression springs. Also, the ramps are circular and faced toward the axis for their camming effect.

The sleeve 38 has outwardly extending projections, such as at 51, and the user can grip the projections and slide the sleeve 38 over the body 12 and thereby, in that one sliding action, the ramps 34 and 44 are moved leftwardly, as viewed, and the springs 36 and 45 are compressed but independently without regard to the movement of either spring imposed on the other spring, and only with regard to the single axial movement of the sleeve 38. That releases the balls 27 and 28 and thus releases the tool 14 so it can be axially withdrawn from the holder 10. Upon release of the sleeve 38, the springs 36 and 45 act independently on the respective balls and thereby force radially on the tool with full respective and independent spring force. So each ramp 34 and 44, and their respective balls 28 and 27, can exert full radial force onto the work tool, and neither set of balls 28 and 27 is influenced by nor dependent upon the other set and therefor is not impeded in exerting its respective radial forces.

In addition to that radial holding, there is axial holding which is free of axial play in the tool 16. FIG. 3 shows the affixed portion 11 has a circular shoulder 52 which abuts the tool end 53 to thereby axially limit movement of the tool leftward in the holder. FIG. 4 shows that the axial distance of the center on axis B of the tool groove 49 from the abutting walls 52 and 53 is slightly greater than the axial distance of the center on axis C of the opening 24 from those abutting walls. Thus, in that shown holding mode with ball 28, the ball is forcing leftward at the groove wall 54 on the tool, and the right side of the wall portion 56 of the hole 24 is forcing leftward on the ball 28 and thus on the tool 14 at wall 54 to restrict the axial movement of the tool to the right and thereby eliminate axial play of the tool. Of course, the camming ramp 34 urges the ball 28 rightwardly against the wall 56 and downwardly against the groove wall 54. So the two separate camming sets provide both radial and axial stability.

So the diameter of the balls 28 are only slightly less than the diameter of the corresponding holes 24, and the curvature of the ball exterior is that of the groove 49, though pushing the ball 28 radially inwardly, as is FIG. 4, causes it to bear against the walls at 54 and 56. So the center of the balls 28 and the center of the groove 49 are eccentric relative to each other in the tool clamping mode shown in FIG. 4.

As required, a specific embodiment is disclosed herein, but it will be obvious to one skilled in the art that changes can be made within the concepts of the aforementioned functional features, all to achieve the two no-play conditions.

What is claimed is:

1. In a holder for replaceable tools, the improvement comprising:

a body having an elongated axis with an opening extending along said axis for receiving a work tool and said body having two axially spaced apart and radially extending holes extending through said body to said opening, two circular members on said body and with said members being axially movable relative to said body and to each other along said axis, each of said members presenting a camming ramp disposed radially outward with respect to each of said holes and being respectively faced toward said opening and being respectively axially movable toward and away relative to the respective locations of said holes, two balls respectively disposed in said two holes and being in respective contact with each of said camming ramps and exposed to said opening and with each of said balls also being separately positionable in contact with the work tool at said spaced apart locations, and two springs disposed and arranged to have each thereof exert axial force on only a respective one of said members for urging said members separately and independently of each other axially and thereby urge said balls into respective contact with the work tool for holding the work tool free of movement relative to said axis.

2. The holder for replaceable tools, as claimed in claim 1, further comprising:

said springs being compression springs arranged to exert compression on the respective one of said balls in only one and the same axial direction.

3. In a holder for replaceable tools, the improvement comprising:

a body having an elongated axis with an opening extending along said axis for receiving a work tool and said body having two axially spaced apart and radially extending holes extending through said body to said opening, two circular members on said body and with said members being axially movable relative to said body and to each other along said axis, a first one of said members being telescoped over said body and having an axially extending opening therein, a second one of said members being telescoped over said body and disposed in said extending opening of said first member, each of said members presenting a camming ramp disposed radially outward with respect to each of said holes and being respectively faced toward said opening and being respectively axially movable toward and away relative to the respective locations of said holes, two balls respectively disposed in said two holes and being in respective contact with each of said camming ramps and exposed to said opening and with each of said balls also being separately positionable in contact with the work tool at said spaced apart locations, and two springs in respective axial contact with said members for urging said members axially and thereby urge said balls into respective contact with the work tool for holding the work tool free of movement relative to said axis.

4. The holder for replaceable tools, as claimed in claim 3, further comprising:

an abutment on said body and an abutment on said first one of said members and said abutments facing each other, and said two springs being disposed between said abutments for exerting forces between said abutments and thereby positioning said ramps in their axial movement.

5. The holder for replaceable tools, as claimed in claim 4, further comprising:

said first one of said members being a sleeve disposed as surrounding said holder and being axially slideable on said body for alternately positioning said sleeve for holding and releasing relative to the tools, and said second one of said members being disposed inside said sleeve.

6. The holder for replaceable tools, as claimed in claim 5, further comprising:

an abutment on said sleeve and being engageable with said second member for axially moving said second member upon sliding said sleeve on said body.

7. The holder for replaceable tools, as claimed in claim 4, further comprising:

an additional abutment on said body for axially engaging one of said springs and thereby have said one spring axially force on said sleeve.

8. In a holder for replaceable tools, the improvement comprising:

a body having an elongated axis with an opening extending along said axis for receiving a work tool and said body having two axially spaced apart and radially extending holes extending through said body to said opening and said body having an exterior with two abutments on said exterior and facing in the same axial direction, two circular members on said body and with said members being axially movable relative to said body and to each other along said axis and said members each having an abutment respectively facing said body abutments, a first one of said members being telescoped over said body and having an axially extending opening therein, a second one of said members being telescoped over said body and disposed in said extending opening of said first member, each of said members presenting a camming ramp disposed radially outward with respective to each of said holes and being respectively faced toward said opening and being respectively axially movable toward and away relative to the respective locations of said holes, two balls respectively disposed in said two holes and being in respective contact with each of said camming ramps and exposed to said opening and with each of said balls also being separately positionable in contact with the work tool at said spaced apart locations, and two springs axially disposed in respective contact with said body abutments and said abutments on said members for urging said members axially on said body and thereby cam said balls into said holes and onto the work tool for holding the work tool free of movement relative to said axis.

9. The holder for replaceable tools, as claimed in claim 8, further comprising:

said first one of said members being a sleeve disposed as surrounding said holder and being axially slideable on said body for alternately positioning said sleeve for holding and releasing relative to the tools, and said second one of said members being disposed inside said sleeve.

10. In an adapter holder for replaceable tools and being removably connectable to a rotational driving tool and having an elongated axis and an opening extending along said axis for receiving a work tool which has a shank, the improvement comprising: two balls included in said adapter and being radially movably supported and being spaced apart in the direction along said axis in an amount greater than the diameter of either of said balls for engaging the shank in respective locations spaced apart in the direction along said axis and with said balls being radially movable relative to the shank, two ramps spaced apart in the direction along said axis and in a spacing at least said diameter and being respectively and separately engaged with each of said balls and movable independent of each other and relative to said balls for moving said balls toward said shank for stabilizing the shank relative to said axis, and resilient means included in said adapter and operative on said ramps for the respective and separate movement of said ramps.

11. In an adapter for a replaceable tool holder, as claimed in claim 10, the improvement further comprising:

two springs operative only respectively on said ramps and only in the same axial direction relative to said axis for urging said ramps independently of the urging of each other and onto said balls for holding the work tool.

12. The replaceable tool holder as claimed in claim 11, further comprising:

a single member axially movable on said body for simultaneously flexing said two springs and thereby urge said ramps onto said balls.

13. In a tool and tool holder which has a body with an elongated axis and an opening extending along said axis for receiving the work tool which has an end wall and an exterior groove therearound at an axial distance from said end wall and having a ball and a spring-urged cam in said holder for controlling the tool axially along said axis, the improvement comprising: said body having an abutment in contact with said tool and wall for establishing the location of said tool along said axis, said ball being located in said holder at a distance from said end wall less than said axial distance of said groove from said end wall to thereby have said ball and said groove eccentric to each other for said ball to force upon said tool at said groove for restricting axial movement of said tool in said holder, two sets of said ball and spring-urged cam axial spaced from each other along said axis on said body, said two cams being movable independent and separate of each other and movable only respectively on said balls, and two springs operative separately and only respectively on said cams for independently urging said cams onto said balls for holding the work tool both radially and axially.

\* \* \* \* \*